United States Patent
Chu et al.

(10) Patent No.: US 7,308,655 B2
(45) Date of Patent: Dec. 11, 2007

(54) METHOD AND SYSTEM FOR ALERTING AN ENTITY TO DESIGN CHANGES IMPACTING THE MANUFACTURE OF A SEMICONDUCTOR DEVICE IN A VIRTUAL FAB ENVIRONMENT

(75) Inventors: Yu Jen Chu, Taipei (TW); Jiann-Yeh Ou, Tainan (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 440 days.

(21) Appl. No.: 10/810,926

(22) Filed: Mar. 25, 2004

(65) Prior Publication Data

US 2005/0216868 A1   Sep. 29, 2005

(51) Int. Cl.
*G06F 17/50* (2006.01)

(52) U.S. Cl. .......................................... 716/1
(58) Field of Classification Search .................. 716/1, 716/2, 11, 19–21; 700/108, 112, 115
See application file for complete search history.

(56) References Cited

U.S. PATENT DOCUMENTS 6,928,334 B2 * 8/2005 Kuo ........................... 700/115
6,980,873 B2 * 12/2005 Shen .......................... 700/108
7,069,533 B2 * 6/2006 Kochpatcharin et al. ...... 716/19
2005/0021165 A1 * 1/2005 Kuo ........................... 700/115
2005/0125763 A1 * 6/2005 Lin et al. ..................... 716/21

OTHER PUBLICATIONS

Su et al., "Application of Dynamic Manufacturing Service Provisioning Mechanism to Delivery Commitment," IEEE, 2000, pp. 107-117.*
Torres et al., "The Virtual Fab the Core of Future Technology Development," IEEE, 1999, pp. 222-226.*

* cited by examiner

*Primary Examiner*—Vuthe Siek
(74) *Attorney, Agent, or Firm*—Haynes Boone, LLP (57) ABSTRACT

A design coordination engine coordinates design implementation among a manufacturing facility, a customer, an IP vendor, and a design group during the design phase of a semiconductor device. The design coordination engine includes a tracking module configured to track design information updates in a design database. The design coordination engine also includes an alert module configured to notify a customer who has accessed a file associated with information updates that occurred during a predefined period of time.

12 Claims, 7 Drawing Sheets

METHOD AND SYSTEM FOR ALERTING AN ENTITY TO DESIGN CHANGES IMPACTING THE MANUFACTURE OF A SEMICONDUCTOR DEVICE IN A VIRTUAL FAB ENVIRONMENT

BACKGROUND

The present disclosure relates generally to semiconductor fabrication systems and, more particularly, to a system and method for notifying entities that semiconductor design changes have occurred.

From the time the primary integrated circuit (IC) was invented, the semiconductor industry has grown dramatically to today's ultra-large scale IC's (ULSIC's) by technological progress in materials, design, processing, and equipment.

Semiconductor technologies are complicated because they involve systems, design, equipment, material, manufacturing, testing, and packaging. Another reason for the complexity of semiconductor technologies is that they involve so many diverse technical areas including logic, analog, mixed signal, radio frequency (RF), memory (such as dynamical random access memory (DRAM), static random access memory (SRAM), and magnetic random access memory (MRAM)), micro-electro-mechanical system (MEMS), and high power. Semiconductor technologies are now regarded as being more mature since the semiconductor industry has well defined and accepted standards including standard cells and manufacturing technologies which are further enhanced by standard equipment. The increased complexity, maturation and scaling of semiconductor technologies have been accompanied by a trend of global coordination in which every device, starting from concept through specification, design, prototyping, qualification, manufacturing, packaging and testing all the way to final product, may go through many semiconductor companies, each of which focuses on a specific area. For example, an IC design house or fabless company focuses on IC design and a foundry focuses on wafer manufacturing.

In the semiconductor manufacturing business, a semiconductor foundry often makes its design system accessible to customers. In this manner, the customer can participate in the semiconductor design process. The design system available to the customer may include a design library associated with the foundry's particular manufacturing technology. It is of course very desirable that the customer's design be compatible with the foundry's particular manufacturing technologies. Usually, design cycles can be very long (for example, 3 months, 6 months, or even more). By the time the customer completes the design of a semiconductor device, it is very possible that the manufacturing technology employed by the foundry has changed from the time design was commenced. If the foundry's technology database is modified and upgraded after a customer has accessed a plurality of technical files used in the customer's design, then the final design by the customer may not be compatible with the foundry's technologies. Inconsistency between the semiconductor technology which the foundry customer uses to perform its design and the updated manufacturing technology currently employed by the foundry can be a significant problem.

Accordingly, what is needed is a system and method thereof that addresses the above discussed issues.

DETAILED DESCRIPTION

In one embodiment, a method and system are provided for coordinating a customer and a manufacturing foundry with respect to design inconsistencies that appear over time in a microelectronics product manufacturing environment. It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
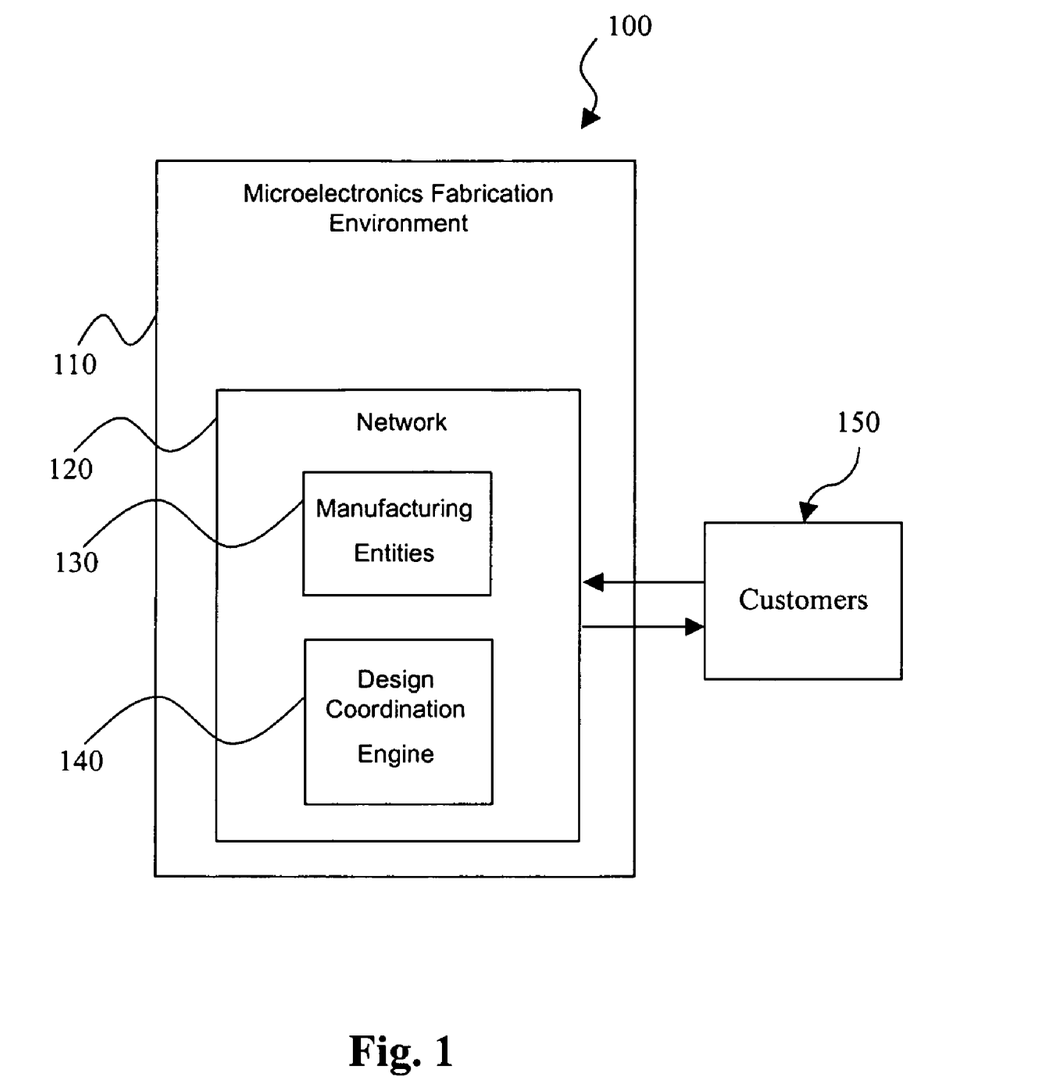
FIG. 1 illustrates a schematic view of one embodiment of a system constructed according to aspects of the present disclosure.

FIG. 1 illustrates a schematic view of one embodiment of a system 100 constructed according to aspects of the present disclosure. The system 100 includes a microelectronics fabrication environment 110, a network 120, a plurality of manufacturing entities 130, and a design coordination engine 140.

The microelectronics fabrication environment 110 includes a microelectronics foundry business. The foundry business includes a myriad of manufacturing facilities for the fabrication of variety of different microelectronics products. For example, there may be at least one manufacturing facility for the front end fabrication of a plurality of microelectronics products, while a second manufacturing facility may provide the back end fabrication for the packaging of the microelectronics products, and a third manufacturing facility may provide other services for the foundry business. The foundry business may further include an unlimited number of fabrication facilities interconnected through the network 120.

The network 120 include a plurality of interconnecting nodes (not shown) for the communication of manufacturing information. The information may include a plurality of message databases for the control and extraction of information from the manufacturing entities 130. The network 120 may include wired and/or wireless interconnections.

The network 120 provides interconnection between manufacturing facilities of the microelectronics fabrication environment 110. The network 120 further provides interconnection between the manufacturing fabrication environment 110 and a plurality of customers 150.

The plurality of manufacturing entities 130 includes a plurality of manufacturing process tools, metrology tools, customer interfaces, design databases, a manufacturing executing system, and other entities associated with the microelectronics fabrication environment 110.

The design coordination engine 140, in one embodiment, includes a plurality of modules which perform the functions of tracking, notifying, and evaluating design documents and updating and accessing their history. The design coordination engine 140 provides for a plurality of computer-implemented systems and methods for carrying out the microelectronics foundry business. The design coordination engine 140 will be described in more details in FIG. 5. The design coordination engine 140 may interact with the plurality of manufacturing entities 130 including a design library that includes design technical documents and which executes functions through the network 120. The design coordination engine 140 can detect an inconsistency between a customer design and updated design database, notify the customer of the inconsistency and new design feature, and follow up customer response and feedback.

Figure 2:
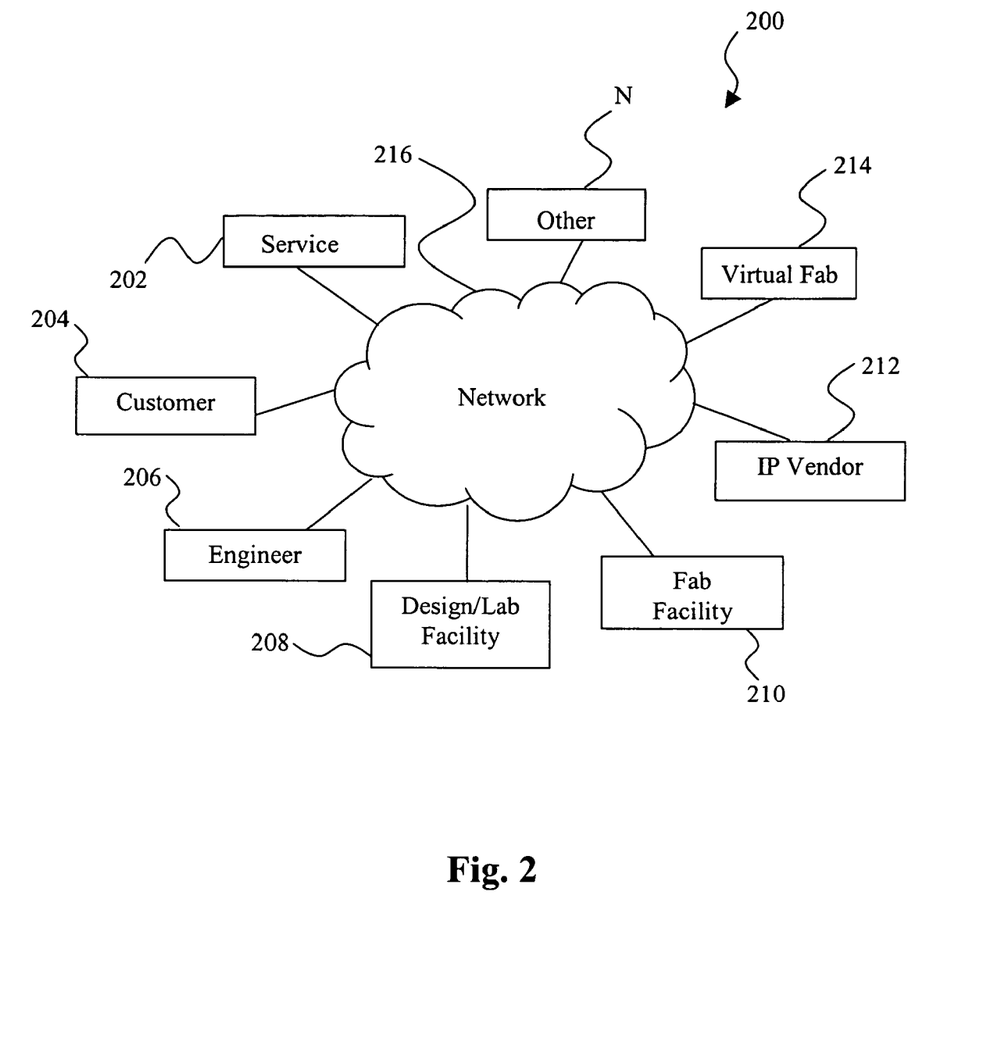
FIG. 2 illustrates a schematic view of one embodiment of an example virtual integrated circuit fabrication system constructed according to aspects of the present disclosure.

Referring to FIG. 2, in another embodiment, a virtual IC fabrication system (a "virtual fab") 200, within which the methodology associated with system 100 of FIG. 1 may be practiced, is illustrated. The virtual fab 200 includes a plurality of entities 202, 204, 206, 208, 210, 212, 214, ..., N that may be connected by a communications network 216. The network 216 may be a single network or may be a variety of different networks, such as an intranet and the Internet, and may include both wireline and wireless communication channels.

In the present example, the entity 202 represents a service system for service collaboration and provision, the entity 204 represents a customer, the entity 206 represents an engineer, the entity 208 represents a design/laboratory (lab) facility ("design group") for IC design and testing, the entity 210 represents a fabrication (fab) facility, and the entity 212 represents an IC design intellectual properties (IP) vendor, and the entity 214 represents another virtual fab (e.g., a virtual fab belonging to a subsidiary or a business partner). Each entity may interact with other entities and may provide services to and/or receive services from the other entities.

For purposes of illustration, each entity 202-212 may be referred to as an internal entity (e.g., an engineer, customer service personnel, a design or fabrication facility, etc.) that forms a portion of the virtual fab 200 or may be referred to as an external entity (e.g., a customer, IP vendor) that interacts with the virtual fab 200. It is understood that the entities 202-212 may be concentrated at a single location or may be distributed, and that some entities may be incorporated into other entities. In addition, each entity 202-212 may be associated with system identification information that allows access to information within the system to be controlled based upon authority levels associated with each entity's identification information.

The virtual fab 200 enables interaction among the entities 202-212 for the purpose of IC manufacturing, as well as the provision of services. In the present example, IC manufacturing includes receiving a customer's IC order and the associated operations needed to produce the ordered ICs and send them to the customer, such as the design, fabrication, testing, and shipping of the ICs.

One of the services provided by the virtual fab 200 may enable collaboration and information access in such areas as design, engineering, and logistics. For example, in the design area, the customer 204 may be given access to information and tools related to the design of their product via the service system 202. The tools may enable the customer 204 to perform yield enhancement analysis, view layout information, and obtain similar information. In the engineering area, the engineer 206 may collaborate with other engineers using fabrication information regarding pilot yield runs, risk analysis, quality, and reliability. The logistics area may provide the customer 204 with fabrication status, testing results, order handling, and shipping dates. It is understood that these areas are exemplary, and that more or less information may be made available via the virtual fab 200 as desired.

Another service provided by the virtual fab 200 may integrate systems between facilities, such as between the design/lab facility 208 and the fab facility 210. Such integration enables facilities to coordinate their activities. For example, integrating the design/lab facility 208, IP vendor 212, and the fab facility 210 may enable design information to be incorporated more efficiently into the fabrication process, and may enable data from the fabrication process to be returned to the design/lab facility 210 for evaluation and incorporation into later versions of an IC.

Figure 3:
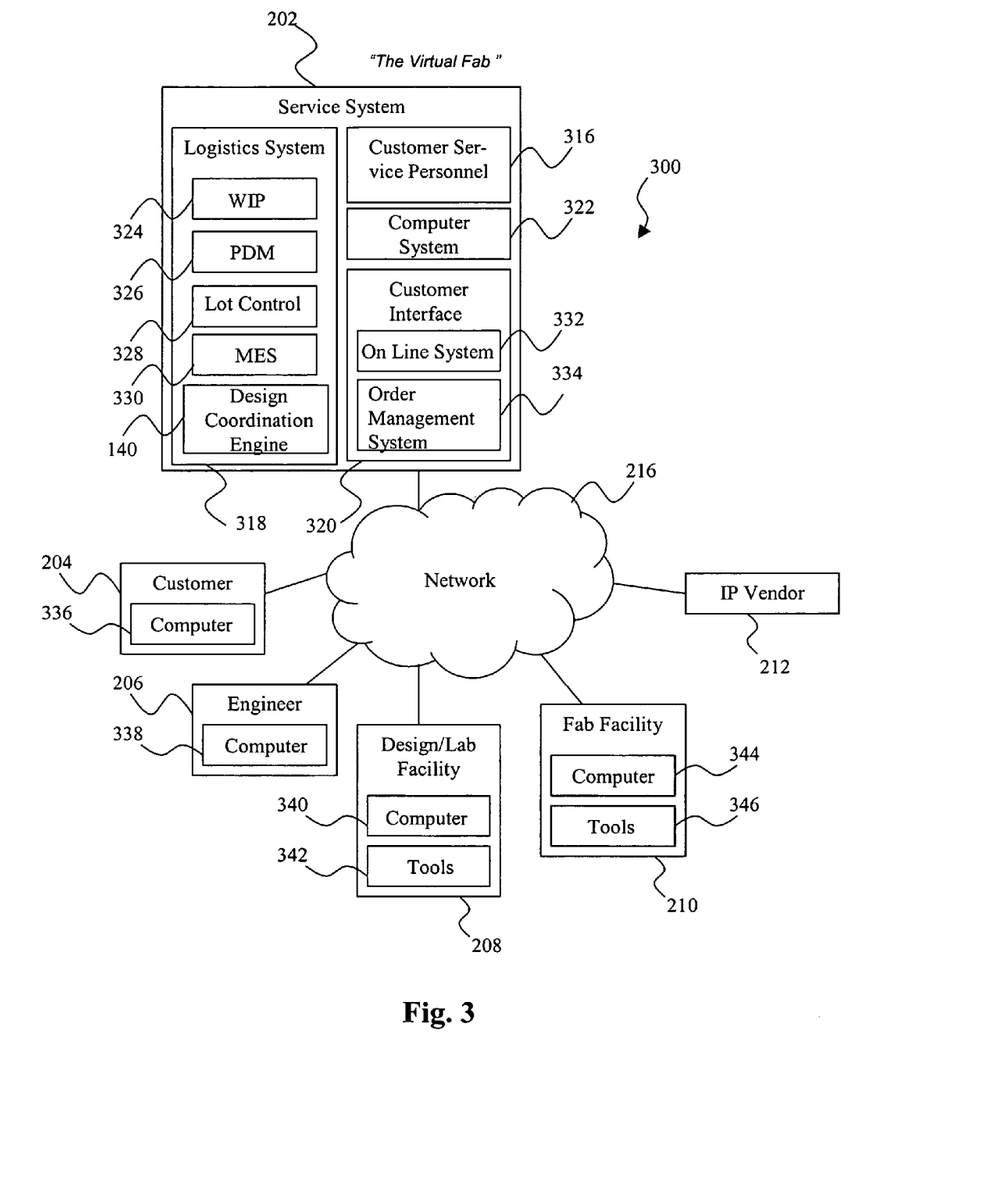
FIG. 3 illustrates a schematic view of another embodiment of an example virtual integrated fabrication system constructed according to aspects of the present disclosure.

Referring to FIG. 3, in another embodiment, a virtual fab 300 illustrates one possible implementation of the virtual fab 200 of FIG. 2. Virtual fab 300 of FIG. 3 is similar to virtual fab 200 of FIG. 2 with like numerals being used to indicate like elements. The virtual fab 300 includes a plurality of entities 202, 204, 206, 208, 210, and 212 that are connected by communications network 216. In the present example, the entity 202 represents a service system, the entity 204 represents a customer, the entity 206 represents an engineer, the entity 208 represents a design/lab facility for IC design and testing, the entity 210 represents a fab facility, and the entity 212 represents a process (e.g., an automated fabrication process). Each entity may interact with other entities and may provide services to and/or receive services from the other entities.

The service system 202 provides an interface between the customer and the IC manufacturing operations. For example, the service system 202 may include customer service personnel 316, a logistics system 318 for order handling and tracking, and a customer interface 320 for enabling a customer to directly access various aspects of an order.

The logistics system 318 may include a work-in-process (WIP) inventory system 324, a product data management (PDM) system 326, a lot control system 328, and a manufacturing execution system (MES) 330, and the design coordination engine 140. The WIP inventory system 324 may track working lots using a database (not shown). The PDM system 326 may manage product data and maintain a product database (not shown). The product database could include product categories (e.g., part, part numbers, and associated information), as well as a set of process stages that are associated with each category of products. The lot control system 328 may convert a process stage to its corresponding process steps.

The MES 330 may be an integrated computer system representing the methods and tools used to accomplish production. In the present example, the primary functions of the MES 330 may include collecting data in real time, organizing and storing the data in a centralized database, work order management, workstation management, process management, inventory tracking, and document control. The MES 330 may be connected to other systems both within the service system 202 and outside of the service system 202. Examples of MES systems 330 include Promis™ (a product of Brooks Automation Inc. of Massachusetts), Workstream™ (a product of Applied Materials, Inc. of California), Poseidon™ (a product of IBM Corporation of New York), and Mirl-MES™ (a product of Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. The MES 330 may include such information as a process step sequence for each product.

The design coordination engine 140 may be integrated into the service system 202 and may further function in the design/lab facility entity 208. The document assemblage engine 140 may provide the collection, creation, and the filtering of documents associated with a myriad of operations included in the virtual fab 200.

The customer interface 320 may include an online system 332 and an order management system 334. The online system 332 may function as an interface to communicate with the customer 204, other systems within the service system 202, supporting databases (not shown), and other entities 206-212. The order management system 334 may manage client orders and may be associated with a supporting database (not shown) to maintain client information and associated order information.

Portions of the service system 202, such as the customer interface 320, may be associated with a computer system 322 or may have their own computer systems. In some embodiments, the computer system 322 may include multiple computers, some of which may operate as servers to provide services to the customer 204 or other entities. The service system 202 may also provide such services as identification validation and access control, both to prevent unauthorized users from accessing data and to ensure that an authorized customer may access only their own data.

The customer 204 may obtain information about the manufacturing of its ICs via the virtual fab 200 using a computer system 336. In the present example, the customer 204 may access the various entities 202, 206-212 of the virtual fab 200 through the customer interface 320 provided by the service system 202. However, in some situations, it may be desirable to enable the customer 204 to access other entities without going through the customer interface 320. For example, the customer 204 may directly access the fab facility 210 to obtain fabrication related data.

The engineer 206 may collaborate in the IC manufacturing process with other entities of the virtual fab 300 using a computer system 338. The virtual fab 300 enables the engineer 206 to collaborate with other engineers and the design/lab facility 208 in IC design and testing, to monitor fabrication processes at the fab facility 210, and to obtain information regarding test runs, yields, etc. In some embodiments, the engineer 206 may communicate directly with the customer 204 via the virtual fab 300 to address design issues and other concerns.

The design/lab facility 208 provides IC design and testing services that may be accessed by other entities via the virtual fab 200. The design/lab facility 208 may include a computer system 340 and various IC design and testing tools 342. The IC design and testing tools 342 may include both software and hardware.

The fab facility 210 enables the fabrication of ICs. Control of various aspects of the fabrication process, as well as data collected during the fabrication process, may be accessed via the virtual fab 300. The fab facility 210 may include a computer system 344 and various fabrication hardware and software tools and manufacturing equipment 346. For example, the fab facility 210 may include an ion implantation tool, a chemical vapor deposition tool, a thermal oxidation tool, a sputtering tool, and various optical imaging systems, metrology tool, as well as the software needed to control these components.

The IP vendor 212 may represent any vendor who provides design IP service including design tool, design library of building block such as standard cell, technical documents, and reference flow.

It is understood that the entities 202-212 of the virtual fab 300, as well as their described interconnections, are for purposes of illustration only. For example, it is envisioned that more or fewer entities, both internal and external, may exist within the virtual fab 200, and that some entities may be incorporated into other entities or distributed. For example, the service system 202 may be distributed among the various entities 206-210.

Figure 4:
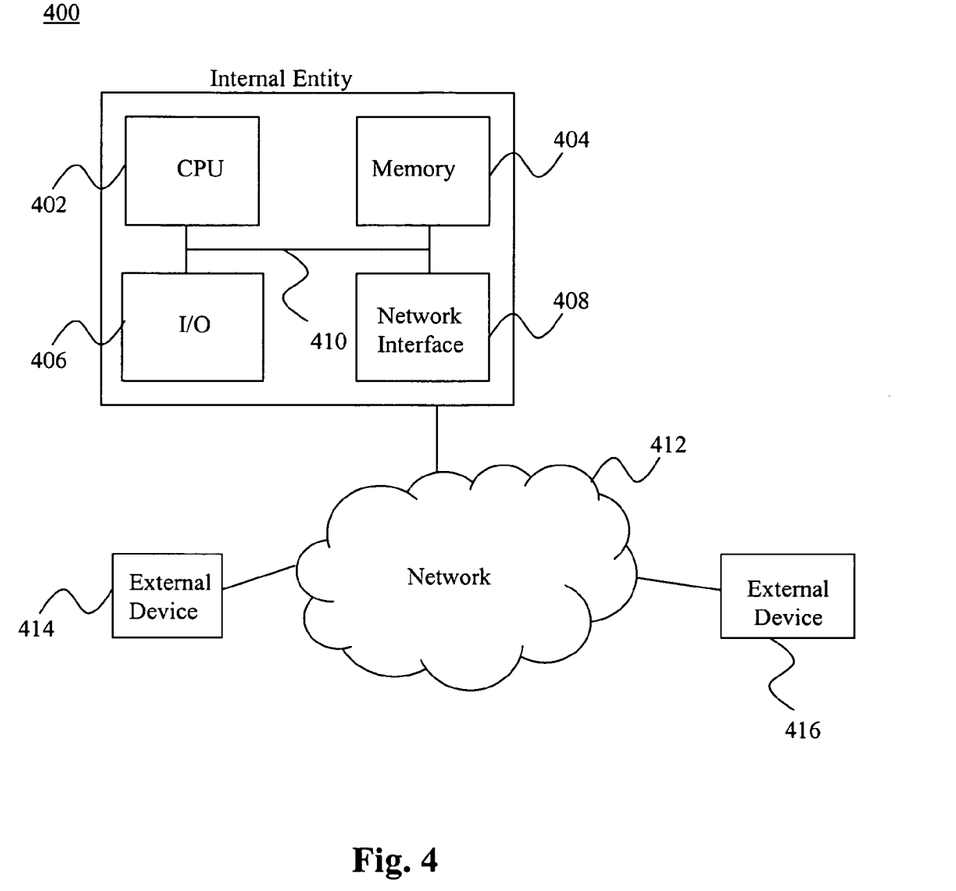
FIG. 4 illustrates a schematic view of another embodiment of an alternate virtual integrated circuit fabrication system constructed according to aspects of the present disclosure.

Referring to FIG. 4, an exemplary computer 400, such as may be used within the virtual fab 200 of FIG. 2 or virtual fab 300 of FIG. 3, is illustrated. The computer 400 may include a central processing unit (CPU) 402, a memory unit 404, an input/output (I/O) device 406, and a network interface 408. The network interface may be, for example, one or more network interface cards (NICs). The components 402, 404, 406, and 408 are interconnected by a bus system 410. It is understood that the computer may be differently configured and that each of the listed components may actually represent several different components. For example, the CPU 402 may actually represent a multi-processor or a distributed processing system; the memory unit 404 may include different levels of cache memory, main memory, hard disks, and remote storage locations; and the I/O device 406 may include monitors, keyboards, and the like.

The computer 400 may be connected to a network 412, which may be connected to the networks 216 (FIGS. 2 and 3). The network 412 may be, for example, a complete network or a subnet of a local area network, a company wide intranet, and/or the Internet. The computer 400 may be identified on the network 412 by an address or a combination of addresses, such as a media control access (MAC) address associated with the network interface 408 and an internet protocol (IP) address. Because the computer 400 may be connected to the network 412, certain components may, at times, be shared with other devices 414 and 416. Therefore, a wide range of flexibility is anticipated in the configuration of the computer. Furthermore, it is understood that, in some implementations, the computer 400 may act as a server to other devices 414 and 416. The devices 414 and 416 may be computers, personal data assistants, wired or cellular telephones, or any other device able to communicate with the computer 400.

Figure 5:
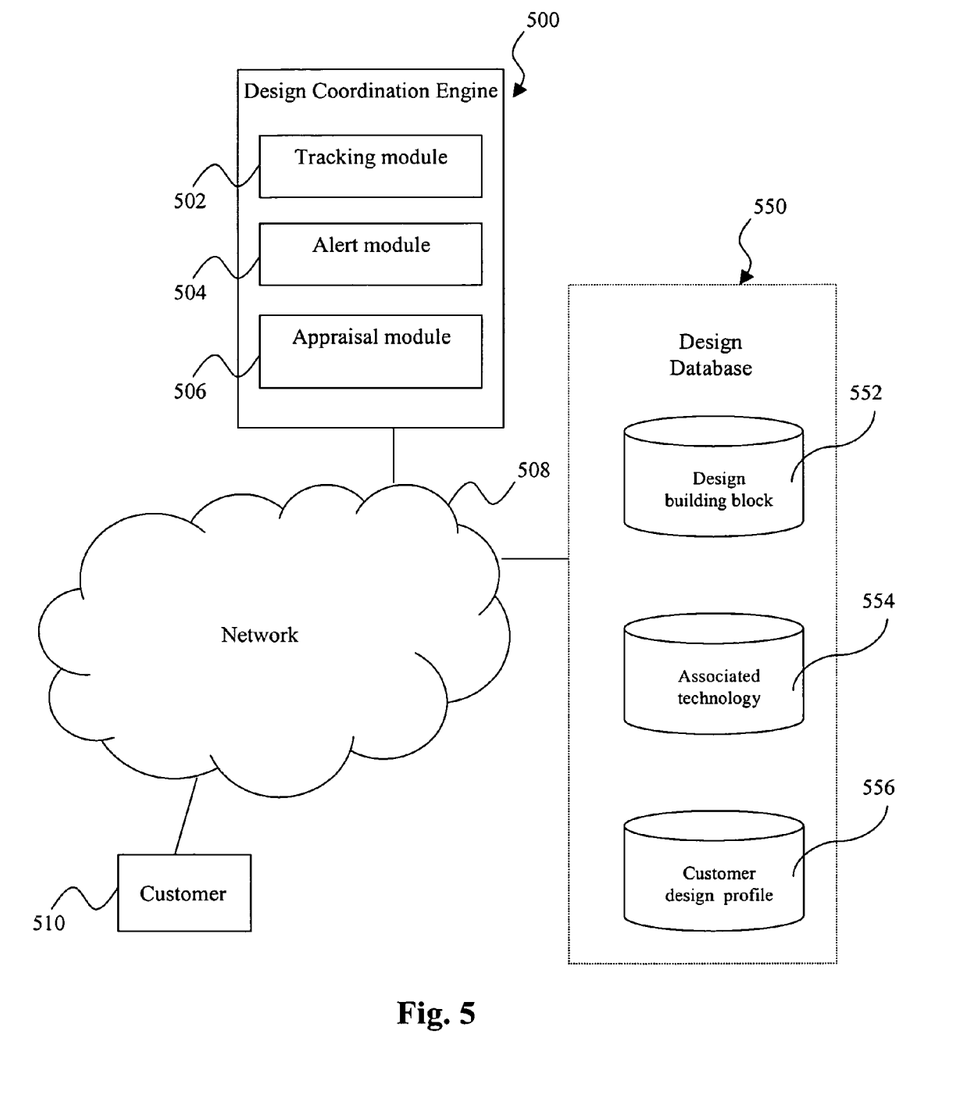
FIG. 5 illustrates a schematic view of one embodiment of a design coordination engine constructed according to aspects of the present disclosure.

Referring to FIG. 5, illustrates a schematic view of one embodiment of a design coordination engine 500 constructed according to aspects of the present disclosure. The design coordination engine 500 includes a tracking module 502, an alert module 504, and an appraisal module 506. Design coordination engine 500 is linked to a network 508 which may be part of a virtual fab 200 defined in FIG. 2 or a virtual fab 300 defined in FIG. 3 wherein the virtual fab is connected to, or includes, a manufacturing entity, design facility, and IP vendor. For simplicity, customer 510 is shown connected to network 508 as part of a virtual fab. However, in actual practice the other previously discussed elements of a virtual fab are connected to network 508 as well. Further connected to network 508 is a design database 550 including a design building block 552, an associated technology block 554, and a customer design profile 556.

Tracking module 502 tracks two types of events associated with design database 550, namely 1) updating of the design database by authorized parties such as the design group and IP vendors; and 2) accessing the design database by a client including external customers and internal users. Tracking module 502 may keep track of changes in a technical file in a design database 550. Such changes may be evaluated in terms of their impact to customers/clients. For example, if a change is minor (determined by some predefined criteria), then the change may be evaluated as having no impact. If the change does impact the client's design, tracking module 502 may further track, sort, and record the client's access to the changed file based on predefined criteria. Such criteria may include, for example, accesses occurring during a predefined period of time which is longer than design cycle time. Any design associated with an access that occurred during this predefined period of time ending at the time when the changing occurred may be still in design phase and will be impacted by the changes.

Alert module 504 may alert a client to a change of a design file when that client accesses a changed design file in design database 550, if the client's design may be impacted by the change as indicated by tracking information collected by tracking module 502. Alert module 504 may inform a client through network 508 with more detailed information including the date of the changes, the background of the changes, and specific content that was changed. Alert module 504 may further forward feedback information from the client to the owner of design database 550 such as IP vendor or design engineers. Alert module 504 may inform clients via different media such as email and wireless messaging.

Appraisal module 506 functions to follow up on changes of design database 550 and the above mentioned communications with impacted clients. The follow-up includes evaluating, sorting, and saving feedback so that the owner of design database 550 can make future improvements in updating and maintaining the design database.

Design database 550 may include a design building block sub-database 552. Examples of such a design building block sub-databases include sub-databases for input/output (I/O) pads, mixed signal blocks, embedded flash memories, core logic cells, etc. Examples of design building block sub-databases may further include a standard library cell, or/and a customer specific library cell.

Design database 550 may include an associated technology sub-database 554. Examples of an associated technology sub-database 554 include a sub-database for design rule check (DRC) for blocks and chip level, a sub-database for layer definition for blocks and chip level, layout versus schematic (LVS) for blocks and chip level, resistance and capacitance (RC) extraction, and etc.

Design database 550 may include a customer design profile sub-database 556. A customer design profile sub-database 556 may be created and maintained by a corresponding client/customer. Customer design profile sub-database 556 may include information such as customer production, order information, production roadmap, technical documents related to customer designs, history of customer implementing new technologies, and etc.

Design database 550 may further include other sub-databases relating to IC designing. Each sub-database of design database 550 may be stored physically in a different location, and be maintained by different owners such as a design group, a customer, and an IP vendor. Design database 550 may be, or may partially be a part of design coordination engine 500.

Figure 6:
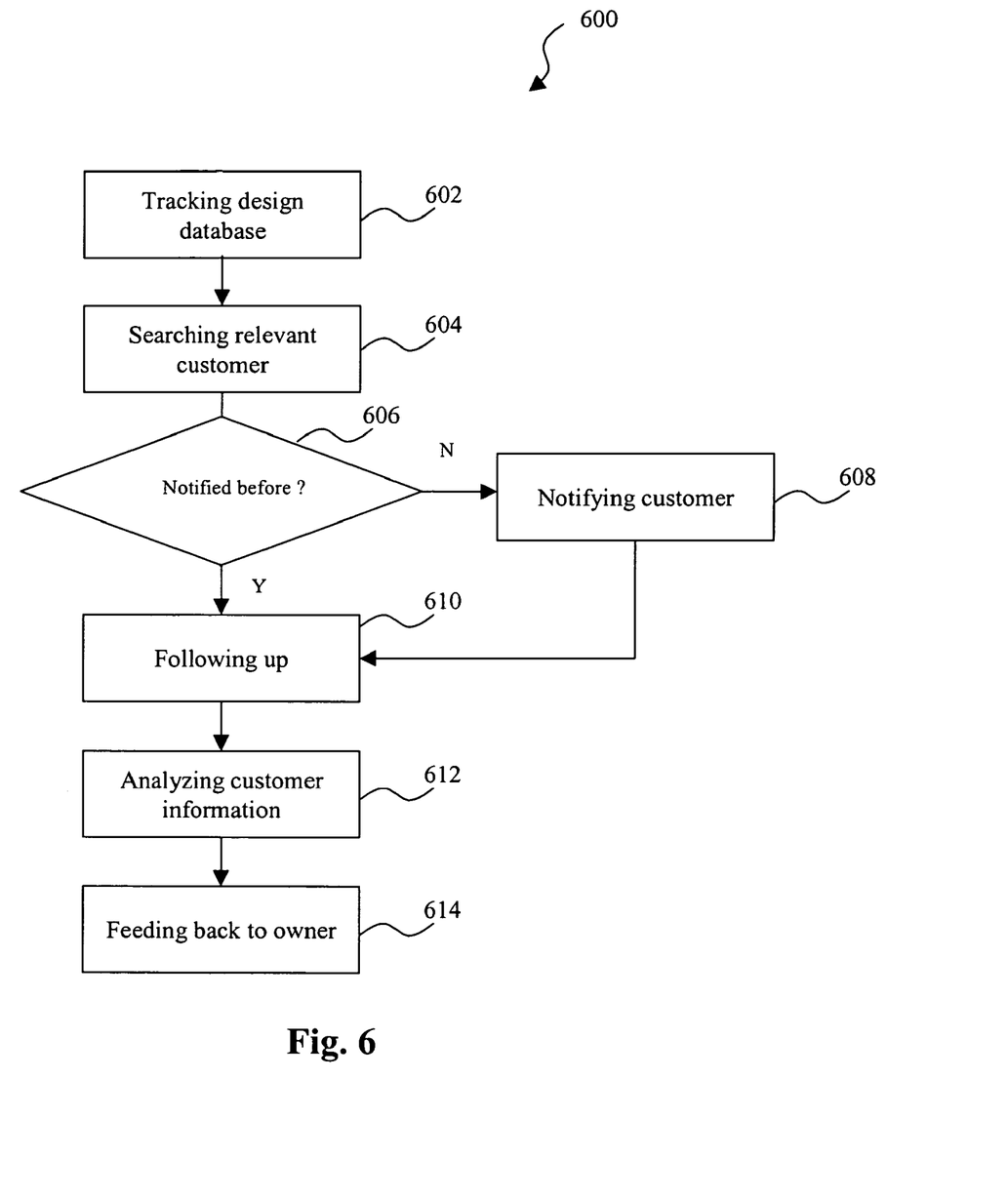
FIG. 6 illustrates a flow chart of one embodiment of a method of design coordination constructed according to aspects of the present disclosure.

FIG. 6 is a flow chart of one embodiment of a method of semiconductor design coordination according to aspects of the present disclosure. The method 600 includes the steps 602-614 for tracking inconsistency of design documents and notifying clients of changes during semiconductor design phase.

The method 600 begins at step 602 at which tracking module 502 tracks design database 550 for changes to the design database. Examples of such changes include: a design building block 552 is modified, replaced, added, deleted, and restricted; an associated technology file 554 has been modified, replaced, added, and deleted according to manufacturing technology upgrade. Further, if any changes have been identified, tracking module 502 may also evaluate the change to determine if customers are impacted according to predefined criteria. If an identified change is also evaluated as an customer related change, the method proceeds to next step. Examples of the predefined criteria include if a change will change a circuit size; if a change will change circuit performance; if a change will change circuit reliability; and if a change will change a circuit specification.

In step 604, related customers are searched. Related customers may be customers who accessed the file associated with information changes during a predefined period of time. In one embodiment, the predefined period of time is defined as a time span which lasts a length of time and ends at the day when the changes occurred, in which the length of time is equal to or longer than design cycle time. Examples of the length of time typically range from three months to twelve months, in one embodiment. A customer who accessed the changed file before the predefined time span may already have its product under fabrication in manufacturing and so is not impacted by the change. The customer-accessing-file information may be acquired through a customer design profile 556.

In step 606, tracking module 502 checks to see if a related customer has been notified of a particular change. If not, the customer is notified of the change by alert module 504 at step 608. Then the method proceeds to next step 610. If yes, the method will skip step 608.

In step 610, tracking module 502 follows up with the customer through tracking the customer design profile and accessing the design file which has been changed. Collected customer information regarding the follow-up will be provided to appraisal module 506.

In step 612, appraisal module 506 analyzes customer information provided by tracking module 502 including follow-up information. Analysis includes long term impact to customer, customer's technology trend that may be impacted by the change, and the customer's feedback including comments and suggestions provided as part of the follow up. Analysis may further include the file-accessing-frequency for each customer and the customer-visiting-frequency for each file in design database. Analysis may result in a report or a summary.

In step 614, alert module 504 feeds back the result of analysis yielded in last step 612 to the proper owner of a changed file, for example as when the owner is a design group or the owner is an IP vendor. The feedback will help the owner optimize its strategy of maintenance and upgrading for the maximum benefit of the customer and manufacturing implementation.

The method 600 may repeat processing steps 604 to 614 until all customers are notified of the impact of an identified change of the design database. The method may repeat processing steps 602 to 614 for a new change in semiconductor device design.

Figure 7:
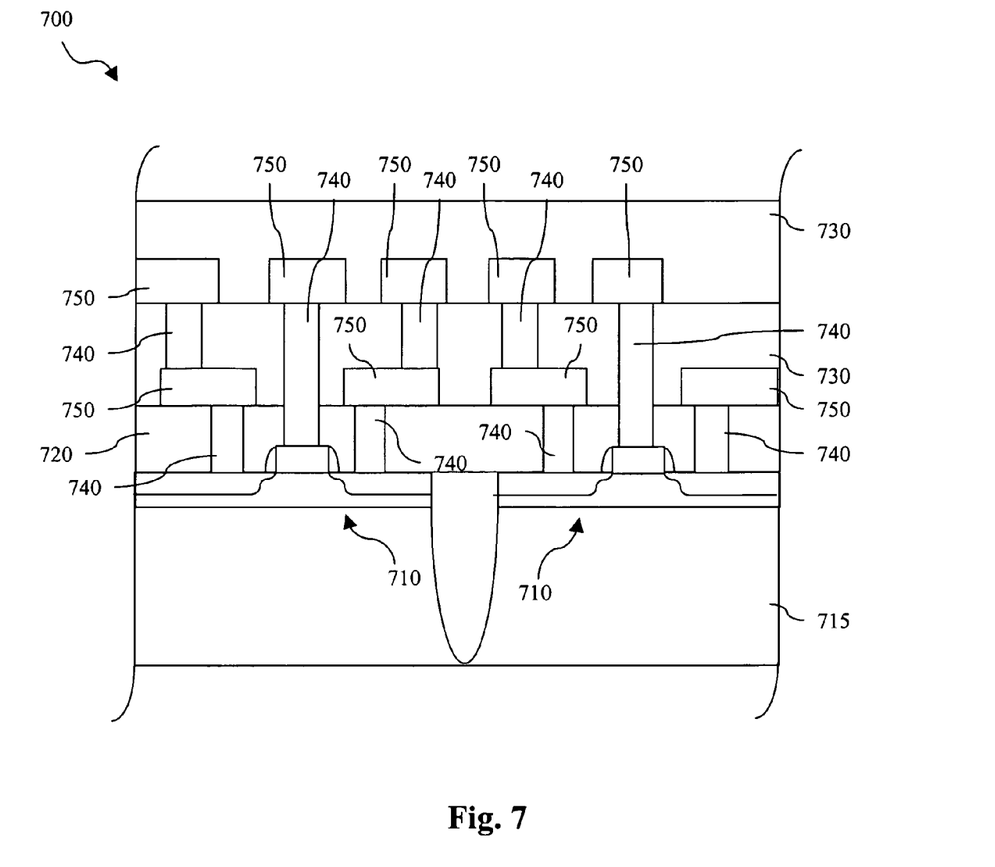
FIG. 7 illustrates a schematic view of an embodiment of an integrated circuit device constructed according to aspects of the present disclosure.

FIG. 7 is a sectional view of one embodiment of an integrated circuit device 700 constructed according to aspects of the present disclosure. The integrated circuit device 700 is one example of designed circuit for which a design coordination engine 500 may be implemented. For example, the integrated circuit device 700 includes a plurality of microelectronics devices 710, wherein one or more of the microelectronics devices 710 may be substantially similar to the microelectronic device. The microelectronics devices 710 may be formed from, in or on a common substrate 715 which may be substantially similar in composition and manufacture to the substrate 715. Of course, the integrated circuit device 700 may include other types of substrates, or multiple substrates, within the scope of the present disclosure.

The substrate 715 may include a plurality of microelectronics devices 710, wherein one or more layers of such a gate structure, or other features contemplated by the integrated circuit device 700 within the scope of the present disclosure, may be formed by chemical-vapor deposition (CVD), physical-vapor deposition (PVD), plasma-enhanced CVD (PECVD), atomic layer deposition (ALD) and/or other process techniques. Conventional and/or future-developed etching and other processes may be employed to define the integrated circuit device 500 from the deposited layer(s).

Of course, the present disclosure is not limited to applications in which the integrated circuit device 700 is a gate structure or the microelectronic device 710 is a transistor or other semiconductor device. For example, in one embodiment, the microelectronic device 710 may be an electrically programmable read only memory (EPROM) cell, an electrically erasable programmable read only memory (EEPROM) cell, a static random access memory (SRAM) cell, a dynamic random access memory (DRAM) cell and/or other microelectronic devices (hereafter collectively referred to as microelectronic devices). The geometric features of the microelectronics device 710 may range between about 1300 Angstroms and about 3 Angstroms.

The substrate 715 may be a silicon-on-insulator (SOI) substrate, and may comprise silicon, gallium arsenide, strained silicon, silicon germanium, carbide, diamond and/or other materials. The substrate 715 may also include one or more uniformly or complementary doped wells. While not limited to any particular dopant types or schemes, in one embodiment, the doped wells employ boron as a p-type dopant and deuterium-boron complexes for an n-type dopant. The deuterium-boron complexes may be formed by plasma treatment of boron-doped diamond layers with a deuterium plasma.

In one embodiment, the doped wells may be formed using a high density plasma source with a carbon-to-deuterium ratio ranging between about 0.1 percent and about 5 percent in a vacuum process ambient. Boron doping may be provided by the mixing of a boron containing gas with a carbon/hydrogen gas. The boron containing gas may include $B_2H_6$, $B_2D_6$ and/or other boron containing gases. The concentration of boron doping may depend upon the amount of boron containing gas that may be leaked or added into the process. The process ambient pressure may range between 0.1 mTorr and about 500 Torr. The substrate 715 may be held at a temperature ranging between the 150° C. and about 1100° C. High density plasma may be produced by a microwave electron cyclotron resonance (ECR) plasma, a helicon plasma, an inductively coupled plasma and/or other high density plasma sources. For example, the ECR plasma may utilize microwave powers ranging between about 800 Watts and about 2500 Watts.

As described above, the doped wells may also be formed of n-type deuterium-boron complex regions of the substrate 715, which may be formed by treating the above-described boron-doped regions employing a deuterium plasma. For example, selected areas of the substrate 715 may be covered by photoresist or another type of mask such that exposed boron-doped regions may be treated with the deuterium containing plasma. The deuterium ions may provide termination of dangling bonds, thereby transmuting the p-type boron-doped regions into n-type deuterium-boron complex regions. Alternatively, deuterium may be replaced with tritium, hydrogen and/or other hydrogen containing gases. The concentration of the n-type regions may generally be controlled by a direct current (DC) or a radio frequency (RF) bias of the substrate 715. The above-described processes may also be employed to form lightly-doped source/drain regions in the substrate 715. Of course, other conventional and/or future-developed processes may also or alternatively be employed to form the source/drain regions.

The integrated circuit device 700 also includes one or more insulating layers 720, 730 located over the microelectronics devices 710. The first insulating layer 720, which may itself include multiple insulating layers, may be planarized to provide a substantially planar surface over the plurality of microelectronics devices 710.

The integrated circuit device 700 also includes vertical interconnects 740, such as conventional vias or contacts, and horizontal interconnects 750 (all spatial references herein are for the purpose of example only and are not meant to limit the disclosure). The interconnects 740 may extend through one or more of the insulating layers 720, 730, and the interconnects 750 may extend along one of the insulating layers 720, 730 or a trench formed therein. In one embodiment, one or more of the interconnects 740, 750 may have a dual-damascene structure. The interconnects 740, 750 may be formed by etching or otherwise patterning the insulating layers 720, 730 and subsequently filling the pattern with refractive and/or conductive material, such as tantalum nitride, copper and aluminum.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A virtual fab comprising:
  a design database including design information for designing semiconductor devices;
  a network coupled to the design database and adapted to communicate with a customer; and
  a design coordination engine, coupled to the network, to track changes in the design information that impact the manufacture of a semiconductor device for the customer;

wherein the design coordination engine includes a tracking module that determines if the customer has accessed the design database within a predetermined time period; and wherein the design coordination engine includes an alert module that alerts the customer if a change in design information occurred during the predetermined time period.

2. The virtual fab of claim 1 wherein the customer accesses design information from the design database to design a semiconductor device.

3. The virtual fab of claim 1 wherein the design coordination engine determines the latest time that the customer has accessed design information that has been changed.

4. The virtual fab of claim 1 wherein the alert module verifies that the customer has not been alerted of the same design information change before.

5. The virtual fab of claim 1 wherein the design coordination system includes an appraisal module.

6. The virtual fab of claim 1 wherein the design database include a design building block sub-database.

7. The virtual fab of claim 1 wherein the design database includes an associated technology sub-database.

8. The virtual fab of claim 1 wherein the design database includes a customer design profile sub-database.

9. A virtual fab, comprising:
a design database including design information for designing semiconductor devices;
a network coupled to the design database and configured to communicate with a customer; and
a design coordination engine coupled to the network and configured to track changes in the design information that impact the manufacture of a semiconductor device for the customer, wherein the design coordination engine includes:
a tracking module configured to determine whether the customer has accessed the design database during a predetermined time period;
an alert module configured to alert the customer if a change in design information occurred during the predetermined time period; and
an appraisal module.

10. The virtual fab of claim 9 wherein the design information is configured to be accessible by the customer via the design database to design a semiconductor device, the design coordination engine is configured to determine the latest time that the customer has accessed design information that has been changed, and the alert module is configured to verify that the customer has not previously been alerted of the same design information change.

11. The virtual fab of claim 9 wherein the design database includes:
a design building block sub-database;
an associated technology sub-database; and
a customer design profile sub-database.

12. A virtual fab, comprising:
a design database including design information for designing semiconductor devices, wherein the design database includes:
a design building block sub-database;
an associated technology sub-database; and
a customer design profile sub-database;
a network coupled to the design database and configured to communicate with a customer; and
a design coordination engine coupled to the network and configured to track changes in the design information that impact the manufacture of a semiconductor device for the customer, wherein the design coordination engine includes:
a tracking module configured to determine whether the customer has accessed the design database during a predetermined time period;
an alert module configured to alert the customer if a change in design information occurred during the predetermined time period; and
an appraisal module;
wherein the design information is configured to be accessed by the customer via the design database to design a semiconductor device;
wherein the design coordination engine is configured to determine the latest time that the customer has accessed design information that has been changed; and
wherein the alert module is configured to verify that the customer has not previously been alerted of the same design information change.

* * * * *